United States Patent
Sugiyama et al.

(10) Patent No.: US 6,689,177 B2
(45) Date of Patent: Feb. 10, 2004

(54) NONAQUEOUS-ELECTROLYTE SECONDARY BATTERY AND METHOD OF MANUFACTURING THE SAME

(75) Inventors: Tsuyoshi Sugiyama, Miyagi (JP); Tatsuo Onozaki, Chiba (JP); Takashi Ono, Fukushima (JP)

(73) Assignee: Sony Corporation, Tokyo (JP)

( * ) Notice: Subject to any disclaimer, the term of this patent is extended or adjusted under 35 U.S.C. 154(b) by 122 days.

(21) Appl. No.: 09/814,632

(22) Filed: Mar. 22, 2001

(65) Prior Publication Data

US 2002/0012834 A1 Jan. 31, 2002

(30) Foreign Application Priority Data

Mar. 23, 2000 (JP) .................................. P2000-081578

(51) Int. Cl.$^7$ ................................................ H01M 2/06
(52) U.S. Cl. ...................... 29/623.2; 429/162; 429/185; 29/623.1
(58) Field of Search ............................... 429/162, 176, 429/178, 177, 185; 29/623.1, 623.5, 623.2

(56) References Cited

U.S. PATENT DOCUMENTS 5,895,731 A * 4/1999 Clingempeel ............... 429/162
6,030,421 A * 2/2000 Gauthier et al. ............ 29/623.1
6,048,639 A * 4/2000 Sonozaki et al. ............ 429/127
6,291,098 B1 * 9/2001 Shibuya et al. ............. 429/163

OTHER PUBLICATIONS

Handbook of Plastics Joining, Plastics Design Library, Chapter 1, p. 1, 1997.*

* cited by examiner

Primary Examiner—Carol Chaney
(74) Attorney, Agent, or Firm—Sonnenschein, Nath & Rosenthal LLP

(57) ABSTRACT

To offer excellent hermeticity inside a battery having high productivity and being covered with package members by means of solving a problem such as sealing failures caused by gaps between sides of lead electrodes and the package members in sealing parts, in which the lead electrode to be disposed. During a step of sealing between ends of the package members and the lead electrodes by fusing the sealing members, or during a step of adhering the fused sealing members to the lead electrodes, stripping sheets made of a material such that the fused sealing members does not adhere to heaters, are inserted between the package members, or the sealing members and the heaters. Accordingly, even if the fused sealing members are forced out from ends of the package members, or leaked toward the outside, the sealing members does not adhere to surfaces of the heaters or crumble their shapes.

7 Claims, 3 Drawing Sheets

NONAQUEOUS-ELECTROLYTE SECONDARY BATTERY AND METHOD OF MANUFACTURING THE SAME

RELATED APPLICATION DATA

The present application claims priority to Japanese Application No. P2000-081578 filed Mar. 23, 2000, which application is incorporated herein by reference to the extent permitted by law.

BACKGROUND OF THE INVENTION

The present invention relates to a lithium ion battery such as a lithium ion polymer secondary battery having a gel-type or plastic macromolecular electrolyte layer, and a method of manufacturing the same.

In recent years, accompanying by a situation that portable small electric equipment such as small, lightweight cellular phones or portable computers has been popularized, second batteries having small, reliable output characteristics and capable of longtime use by recharging many times such as nickel-cadmium batteries, nickel-hydrogen batteries and lithium ion batteries has been studied and developed vastly as an electric source for supplying electric power to drive the electric equipment.

Among the secondary batteries, the lithium ion secondary battery has characteristics capable of outputting stable electric power despite its small, lightweight, thin in size, and has studied and developed for the purpose of employing as a foldable secondary battery by taking advantage of suitable structural characteristics for its thin size.

Further, as technique capable of achieving the above-mentioned thin size and foldable shape, and of gaining superior characteristics free of leakage unlike the case of employing liquid electrolyte as a dry cell, it is suggested that a technique employs gel-type electrolyte including plasticizer realizing flexibility, and a technique employs macromolecular solid electrolyte, in which a lithium salt is dissolved in a macromolecular material.

In such lithium ion secondary batteries with a thin structure, generally, the main part of the battery is formed in the following manner. A laminating structure is formed by laminating a positive electrode, a positive electrode active material layer, a gel-type macromolecular solid electrolyte layer, a separator, a negative electrode, a negative electrode active material layer. A positive electrode lead and a negative lead electrode joints to the corresponding electrodes in the laminating structure. After this, the laminating structure is covered with package members made of aluminum/ polypropylene•laminate pack material, and sealed ends.

As for materials used for the above-mentioned schematic structure, for instance, materials described later can be preferably used. Plastic materials employed here are shortened hereinafter: polyethylene terephthalate; PET, fused polypropylene; PP, cast polypropylene; CPP, polyethylene; PE, low-density polyethylene; LDPE, high-density polyethylene; HDPE, linear low-density polyethylene; LLDPE, nyron; Ny. Additionally, aluminum, which is a metal material employed as a barrier film having moisture permeability resistance, is shorten as AL.

The most typical structure is a combination such that a package member, a metal film and a sealant layer are respectively PET, AL, and PE. Other typical laminating structures can be also employed as the same as this combination. Such combinations are: PET/AL/CPP, PET/AL/PET/CPP, PET/Ny/AL/CPP, PET/Ny/AL/Ny/CPP, PET/Ny/AL/Ny/PE, Ny/PE/AL/LLDPE, PET/PE/AL/PET/LDPE, or PET/Ny/AL/LDPE/CPP.

As for materials employed as the sealant layer of a laminating film, the above-exemplified PE, LDPE, HDPE, LLDPE, PP, and CPP and the like can be employed, and its thickness is preferably in a range of $20\,\mu m \sim 100\,\mu m$ based on the observed results. The fusion temperature of the materials employed as the sealant layer are generally hereinafter. The fusion temperature of PE, LDPE, HDPE and LLDPE are within a range of 120–150° C., that of PP and CPP are about 180° C., and the fusion temperature of PET employed as the package layer is over 230° C.

As materials employed as a barrier film having moisture permeability resistance, although aluminum is exemplified in the above example, it is not limited, and materials capable of forming thin films by means of sputtering can be employed. As for such materials, alumina ($Al_2O_3$), silicon oxide ($SiO_2$), and silicon nitride (SiNx) can be employed.

In a conventional means for sealing the ends of the package members of the lithium ion secondary battery with a thin structure, generally, adhesive material with high adhesion for the metal material and the package members of the lead electrodes, is applied on a position where the ends of the package members are sealed, and pressure is applied on the position to be sealed. In another means, the adhesive material is only applied to surfaces of the sealed positions in each of the lead electrodes and the ends of the package members are applied pressure to each of the lead electrodes so as to seal the part.

However, in the conventional sealing structure and method of manufacturing the same using the adhesive material as described above, there are problems such that even if the package members can be completely sealed to principal surfaces of the lead electrodes, gaps are easy to be produced between sides of the lead electrodes and the package members, which causes an incomplete sealing state (or hermeticity decrease), thereby, insides of the batteries are susceptible to influence of temperature variations or influence from the outside, and by secular change in the batteries, the insides of the batteries deteriorates rapidly, which results in decrease of electromotive force and reduction of durability. Additionally, such batteries occurred the gaps causing degradation of battery capability, must be treated as a nonconforming battery, which results in productivity decrease.

SUMMARY OF THE INVENTION

The invention has been achieved in consideration of the above problems and its object is to provide a lithium ion battery with high productivity and excellent in hermeticity inside the battery covered with a package member by means of preventing sealing failures caused by a gap occurred between sides of a lead electrode and the package member, and a method of manufacturing the same.

A nonaqueous-electrolyte secondary battery according to the present invention comprises a laminating structure, in which at least a positive electrode and a negative electrode are laminated, a film-like or sheet-like package member for covering the laminating structure, a lead electrode whose one end joints to the laminating structure and the other end protrudes toward the outside from an end of the package member, and a sealing member, which is inserted between the end of the package member and the lead electrode by fusing a thermoplastic material, and seals the gap therebetween.

In a method of manufacturing a nonaqueous-electrolyte secondary battery according to the present invention, a step of sealing a gap between a lead electrode and an end of a package member, whereby a sealing member made of a thermoplastic material is inserted between the lead electrode and the end of the package member, wherein the electrode whose one end connects to the laminating structure and the other end protrudes from the end of the package member toward the outside, and the sealing member fuses in order to seal the gap therebetween.

Further, a method of manufacturing another nonaqueous-electrolyte secondary battery according to the present invention comprises a step of sealing a gap between a lead electrode and an end of a package member, whereby a sealing member made of a thermoplastic material is inserted between a lead electrode and the end of the package member, wherein the electrode whose one end joints to a laminating structure and the other end protrudes from an end of a package member toward the outside, a heater is applied to heat to the ends of the sealing member for fusion at temperature over its fusion temperature from the outer side.

Further more, a method of manufacturing another nonaqueous-electrolyte secondary battery according to the present invention comprises a step of sealing a gap between a lead electrode and an end of a package member, whereby the sealing member made of a thermoplastic material is inserted between the end of the package member and the lead electrode whose one end joints to the laminating structure and the other end protrudes from the end of the package member toward the outside, a heater is applied pressure to at least the end of the package member from the outside, a stripping sheet made of a material such that at least its surface does not adhere to the sealing member, is inserted, then the heater is generated heating to the sealing member at temperature over its fusion temperature for fusion.

A method of manufacturing another nonaqueous-electrolyte secondary battery according to the present invention comprises steps of fusing a sealing member, whereby the sealing member is inserted between a lead electrode whose one end joints to the laminating structure, and the other end protrudes from an end of the package member, at least pressure is applied to the end of the package member from the outside, a stripping sheet made of a material such that at least its surface does not adhere to a sealing member, is inserted between a heater and the package member, or the sealing member, and of separating the stripping sheet from the package member, or the sealing member whereby after the sealing member can spread between the lead electrode and the package member without a gap after heating and fusing the sealing member, the stripping sheet is separated from the heater, then the fused sealing member re-solidifies to be made in a solid state.

A method of manufacturing another nonaqueous-electrolyte battery according to the present invention comprises steps of fusing a sealing member, whereby the sealing member made of a thermoplastic material is disposed in a predetermined position of a lead electrode, pressure is applied to at least the sealing member from the outside, a stripping sheet made of a material such that at least its surface does not adhere to the sealing member, is inserted between the heater and the sealing member, and of separating the stripping sheet from the package member, whereby after sealing member can spread between the lead electrode and the package member without a gap by heating and fusing the sealing member, the stripping sheet is separated from the heater, then after the fused sealing member re-solidifies to be made in a solid state.

In a nonaqueous-electrolyte secondary battery and a method of manufacturing the same, since a sealing member made of a thermoplastic material is fused and inserted between an end of a package member and a lead electrode for sealing a gap, the sealing member can spread therebetween. Since the sealing member adhere to the lead electrode by fusing the sealing member, the sealing member adhere to the lead electrode without a gap.

In a method of manufacturing a nonaqueous-electrolyte secondary battery according to the present invention, during a step of sealing a gap between an end of a package member and a lead electrode by fusing and inserting a sealing member, since a stripping sheet made of a material such that at least its surface does not adhere to the sealing member, is inserted into the package member or the sealing member and the heater, the heater is applied pressure and generated heating to the package member or the sealing member, even if the fused sealing member is leaked or forced out from the end of the package member toward the outside, it does not adhere to a surface of the heater.

Additionally, since the stripping sheet has a sheet-like shape unlike the case it is annexed to the surface of the heater in a flat shape, the heater presses the stripping sheet in a manner of shaping along with a concave-convex shape of the sealing member, thereby, even if after the sealing member fuses and spreads between the package member, the package member and the sealing member are soon stripped from the heater with the stripping sheet, the shape of the sealing member and the state of the lead electrode can be maintained until the sealing member re-solidifies to be made in a solid state.

For this reason, without letting the heater is repeated to heat and cool itself, when heating generated is necessary, the heater pressed the package member and the sealing member in order to fuse the sealing member, then on the sealing member fuses enough, the heater is separated from the package member covered with the stripping sheet and the sealing member, which gives the time when the sealing member cools and re-solidifies at room temperature, or by forced cooling wind. This also maintains the shape of the sealing member even if the heater is apart when the sealing member does not solidify yet. From this point, the stripping sheet is desirable used in a sheet-like state, which can be separated from the heater rather than coating on the surface of the heater.

In the case that the above-mentioned lithium ion battery is a solid electrolyte battery, or gel-type electrolyte gel, as a macromolecule material employed for macromolecular solid electrolyte, silicon gel, acryl gel, acrylonitrile gel, polyphosphazen denatured polymer, polyethylene oxide, polypropylene oxide, and composite polymer of the above-mentioned materials, cross-linked polymer of the above-mentioned materials, denatured polymer of the above-mentioned materials can be employed, as for fluorine polymer, for example, poly(vinylidenefluororide), poly(vinylidenefluororide-co-hexafluoropylene), poly(vinylidenefluororide-co-tetrafluoroethylene), poly(vinylidenefluororide-co-trifluoroethylene) and mixture of the above-mentioned materials can be employed. Additionally, various materials can be also employed as the same as the above-mentioned materials.

As for solid electrolyte, or gel-type electrolyte stacked on a positive electrode active layer, or a negative electrode active layer, preferable materials are made by the following processes. First, a solution comprising a macromolecular compound, an electrolyte salt, and a solvent, is impregnated into the positive electrode active material, or the negative electrode active material in order to remove the solvent, and solidifies. The solid electrolyte, or the gel-type electrolyte stacked on the positive electrode active layer, or the negative electrode active layer is impregnated into the positive electrode active layer or the negative electrode active layer, and solidifies. In case of a cross-linked material, after the above-mentioned processes, light or heat is applied to conduct cross-liking to solidify.

The gel-type electrolyte is made of plasticizer including a lithium salt and a matrix macromolecule in the range of equal to or more than 2 percentage by weight and equal to or less than 3 percentage by weight. At this moment, esters, ethers, and carbonic acid esters can be employed independently, or as one component of plasticizer.

When adjusting the gel-typed electrolyte, as for the matrix macromolecule gelling the above-mentioned carbonic acid esters, although various macromolecules employed for forming the gel-type electrolyte, fluorine macromolecules such as poly(vinylidenefluororide), poly(vinylidenefluororide-co-hexafluoropropylene) are preferably employed from reduction-oxidation stability point of view.

The macromolecular electrolyte is made of the lithium salt and the macromolecular compound, in which the lithium salt is dissolved. As for the macromolecular electrolyte, ether macromolecule such as poly(ethylene oxide) and cross-linked polyethylene oxide, poly(methercrylateester), acrylates, fluorine macromolecules such as poly(vinylidenefuluororide), poly(vinylidenefluororide-co-hexafluoropropylene) can be employed independently, or as a mixture among the above-mentioned materials. From reduction-oxidation stability point of view, preferably, the fluorine macromolecules such as poly(vinylidenefluororide) or poly(vinylidenefluororide-co-hexafluoropropylene) can be employed.

As the lithium salt included in the gel-type electrolyte or the macromolecular solid electrolyte, a lithium salt used for typical electrolyte as a battery can be employed. More detail, the following materials are considered: lithium chloride; lithium bromide; lithium iodide; chloric lithium; lithium perchlorate; lithium bromate; lithium iodate; lithium nitrate; tetrafluorolithiumborate; hexafluorophosphoriclithium; lithium acetate; bis(trifluoromethanesulfonil)imidelithium, $LiA_sF_6$, $LiCF_3SO_3$, $LiC(SO_2CF_3)_3$, $LiAlCl_4$, $LiSiF_6$. In case of the gel-type electrolyte, preferable dissolution density of the lithium salt is in the range of 0.1 to 3.0 mol in plasticizer, more preferably, in the range of 0.5 to 2.0 mol. Additionally, the kinds of the lithium salt, or its dissolution density is not limited by the above-mentioned materials and dissolution density.

As a negative electrode material, a material capable of doping or un-doping lithium is preferable. As such a material, for example, a non-graphitizing carbon material, or a graphite material is preferably employed. Further detail, pyrocarbons, cokes (pitch coke, needle coke, petroleum coke), graphites, glassy carbons, organic macromolecular compound calcinated materials (materials such that phenolic resin, furan resin and the like are calcinated at proper temperature), carbon fiber, carbonaceous materials such as activated carbon can employed. As for other materials, macromolecules such as polyacetylene, polypyrrole or oxide such as $SnO_2$ can be employed. In a case of forming a negative electrode using such materials, well-known binders may be doped.

On the other hand, a positive electrode can be formed using metal oxide, metal sulfide or specific macromolecules as positive electrode active materials, depending on kinds of achieved batteries. Take the case where lithium ion batteries are formed, for instance, as the positive electrode active material, metal sulfide or metal oxide such as $TiS_2$, $MoS_2$, $NbSe_2$, $V_2O_5$ which includes no lithium, or lithium complex oxide mainly including $LiMO_2$ and the like can be employed. As for transition metal M forming lithium complex oxide, Co, Ni, Mn are preferable. $LiCoO_2$, $LiNiO_2$, $LiNiyCo1-yO_2$ and the like can be considered as specific examples of such lithium complex oxide. In the formula described before, M represents equal to or more than one kind of transition metal, x is a value satisfying in accord with a discharge state of the battery, typically in the range of 0.05 to 1.10, y is a value satisfying by formula: $0<y<1$. These lithium complex oxide are capable of generating high voltage, which forms the positive electrode active material having excellent characteristics in energy density. A plurality of the positive electrode active materials may be used for the positive electrode by mixing. When forming a positive electrode using the positive electrode active material, well-known conducting agents or binders can be doped.

Other and further objects, features and advantages of the invention will appear more fully from the following description.

BRIEF DESCRIPTION OF THE DRAWINGS

These and other objects and features of the present invention will become clear from the following description of the preferred embodiments given with reference to the accompanying drawings, in which.

DETAILED DESCRIPTION OF THE PREFERRED EMBODIMENTS

Figure 1A:
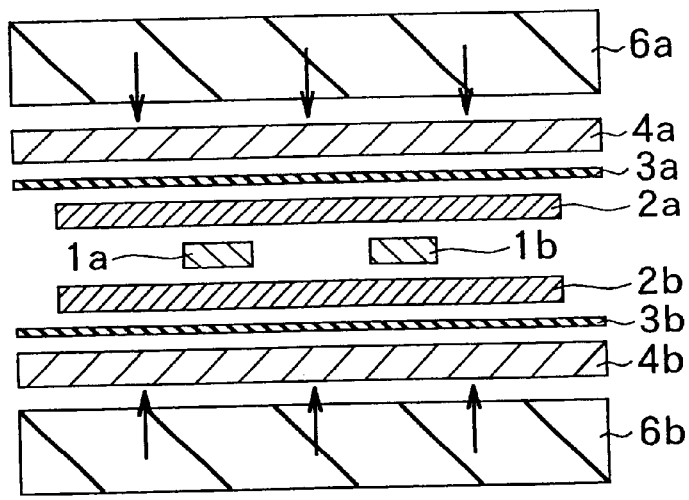
FIGS. 1A–1C are schematic views showing a method of manufacturing a lithium ion polymer battery relative to the embodiment of the present invention.

Embodiments of the invention will be described in detail hereinbelow by referring to the drawings.

FIGS. 1A–1C and 2A–2B are schematic views showing a method of manufacturing a lithium ion polymer secondary battery relative to an embodiment of the present invention. FIGS. 1A–1C and 2A–2B shows a condition observed in a direction shown as an arrow A in FIG. 4. FIG. 3 is a view showing a two-dimensional schematic structure of sealed ends of sealing package members observed in a direction shown as an arrow B in FIG. 4. The structure of a sealed part of the lithium ion polymer secondary battery relative to the embodiment of the present invention is also explained hereinafter because it is embodied by the manufacturing method relative to the embodiment of the present invention. Additionally, in FIGS. 1A–1C, 2A–2B and detailed explanation based on the above-mentioned drawings, for avoiding complicated drawings and explanation, a sealing step in the method of manufacturing the lithium ion polymer secondary battery is only described in detail, and other steps such as a forming step of a laminating structure or a cutting step of a lead electrode, are omitted.

Sealing members 2a and 2b, which are made of a thermoplastic material such as cast polypropylene and are not applied to heat for fusion yet, are disposed in a manner that predetermined sealed positions of lead electrodes 1a and 1b are sandwiched from positions above and beneath the positions respectively. Disposed above and beneath the sealing members 2a and 2b are respectively ends of package members 3a and 3b formed by laminating rolled aluminum foil to polypropylene films. Outside the ends of the package members 3a and 3b, stripping sheets 4a and 4b made of Teflon sheets are disposed (see FIG. 1A). Although illustrations are omitted, the lead electrodes 1a and 1b are connected to a laminating structure, or spiral electrode units, in which a positive electrode, a negative electrode, and a separator are laminated and formed as a structure inside a thin and flat battery.

Figure 1B:
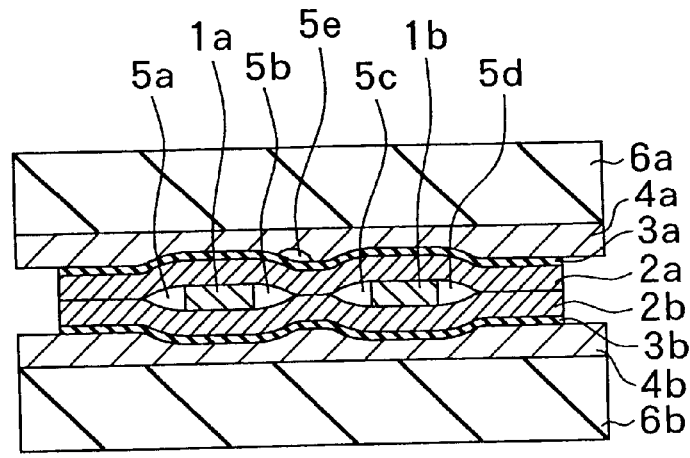

Following this, from the outside of the stripping sheets 4a and 4b, in order to heat the sealing members 2a and 2b, the lead electrodes 1a and 1b, and the ends of the package members 3a and 3b, heaters 6a and 6b are applied pressure to the predetermined positions, in which the package members 3a and 3b disposed the sealing members 2a and 2b therebetween are to be sealed. As the above-mentioned moment, in a condition that temperature is not enough to fuse because heat just begins to be applied, therefore, the sealing members 2a and 2b are not fused yet, gaps 5a, 5b, 5c, 5d, 5e and the like shown FIG. 1B are likely to exist between the sealing members (2a and 2b) and the lead electrodes (1a and 1b) or between the sealing members (2a and 2b) and the package members (3a and 3b).

Figure 1C:
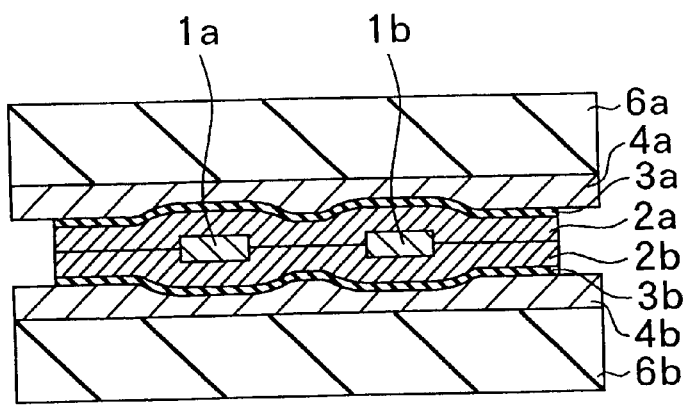

As the positions in which the ends of the package members 3a and 3b are to close, are applied to heat, the fused sealing members 2a and 2b can spread between the lead electrodes (1a and 1b) and the package members (3a and 3b) as shown in FIG. 1C. At this moment, although there is a case such that the excess sealing members 2a and 2b are leaked or forced out toward the outside of the package members 3a and 3b, since the stripping sheets 4a and 4b made of Teflon sheet are disposed between the sealing members (2a and 2b) and the heaters (6a and 6b), it prevents that the forced-out sealing members 2a and 2b fuses and adheres on surfaces of the heaters 6a and 6b. Teflon sheet is a material, which prevents the fused sealing members 2a and 2b from adhering.

Figure 2A:
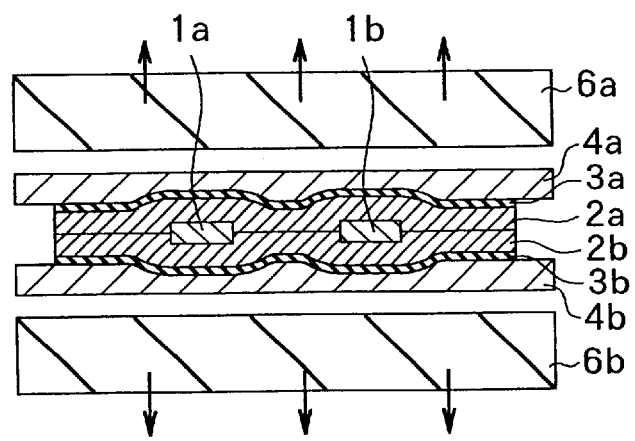
FIGS. 2A and 2B are schematic views showing the method of manufacturing the lithium ion polymer battery relative to the embodiment of the present invention.
Figure 3:
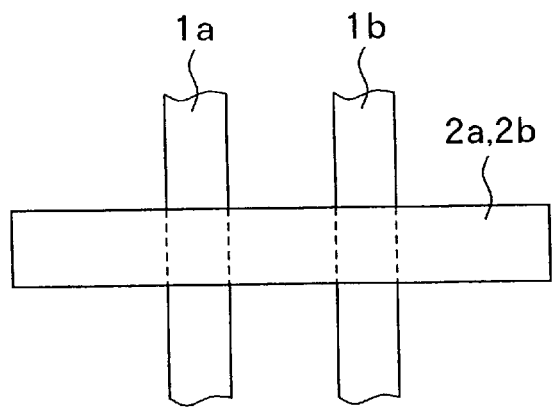
FIG. 3 is a plain view showing a schematic structure of sealed ends of package members.

As mentioned above, after the sealing members 2a and 2b completely fuses and spreads between the lead electrodes (1a and 1b) and the heaters (6a and 6b) without gaps, the whole body covered with the stripping sheets 4a and 4b are stripped from the heaters 6a and 6b together with the stripping sheets 4a and 4b as shown FIG. 2A. In this time, the stripping sheets 4a and 4b is applied to heat under pressure with the heaters 6a and 6b, and even if the heaters 6a and 6b are removed, the stripping sheets 4a and 4b holds a shape along with concavo-concave shapes of the lead electrodes 1a and 1b or the package members 3a and 3b, which allows the whole body to cool down until the sealing members 2a and 2b re-solidifies as keeping a condition that the package members 3a and 3b, or the sealing members 2a and 2b, the lead electrodes 1a and 1b are sandwiched between the stripping sheets 4a and 4b. In connection with this, a cooling fun may be used for air-cooling, or a cooling may be conducted at room temperature. Either ways can be selected depending ion a speed at which the sealing members 2a and 2b re-solidifies.

Figure 2B:
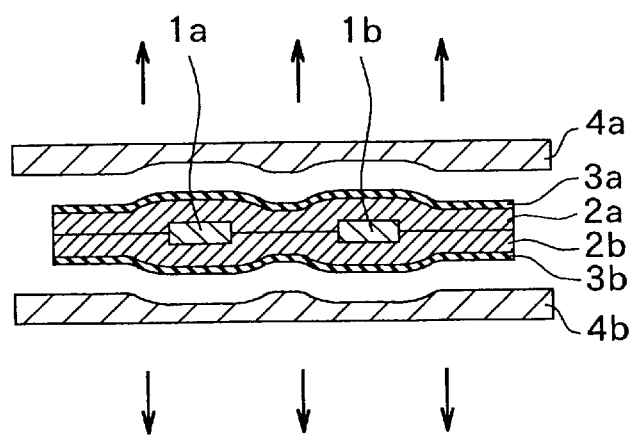

After the sealing members 2a and 2b re-solidifies, as shown in FIG. 2B, the stripping sheets 4a and 4b are apart from the package members 3a and 3b.

As described above, the package members 3a and 3b can be completely sealed by means of the sealing members 2a and 2b, which results in enhancing durability of the battery and increasing its productivity.

Although in the sealing process relative to the above-mentioned embodiment, it is described that the sealing members 2a and 2b adheres to the lead electrodes 1a and 1b without gaps, and also adheres to the package members 3a and 3b without gaps for sealing the ends of the package members 3a and 3b by means of a single step employing the heaters 6a and 6b, the present invention is not limited by the embodiment. The similar technique to the previous step can be applied to a manufacturing step such that after the sealing members 2a and 2b adheres to the lead electrodes 1a and 1b without gaps by means of a single step employing the heaters 6a and 6b, in another step, the ends of the package members 3a and 3b adheres to the surfaces of the sealing members 2a and 2b, which seals the parts to be sealed.

In a manufacturing process employing the heaters (6a and 6b) and the stripping sheets 4a and 4b as shown in FIGS. 1A–1C and 2A–2B, without the package members 3a and 3b, the stripping sheets 4a and 4b are disposed in a manner of directly contacting the sealing members 2a and 2b, then from the outside of the stripping sheets 4a and 4b, heat is applied under pressure with the heaters 6a and 6b in order that the sealing members 2a and 2b adheres to the lead electrodes 1a and 1b without gaps. Following this, the ends of the package members 3a and 3b adheres to the surfaces of the sealing members 2a and 2b with thermocompression bonding or adhesion materials, thereby enabling the ends of the package members 3a and 3b to be sealed.

Figure 4:
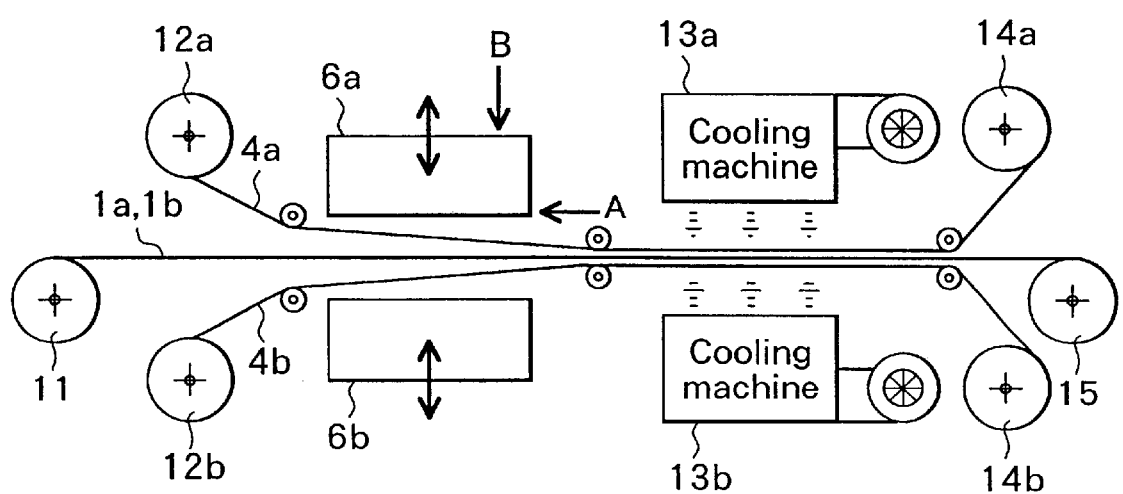
FIG. 4 is a schematic view showing a main part of a manufacturing process conducting that the sealing members fuses and adheres to lead electrodes without gaps.

Such a step of adhering the fused sealing members 2a and 2b to the lead electrodes 1a and 1b can be conducted by a manufacturing apparatus whose main part is schematically shown in FIG. 4.

Initially, the lead electrodes 1a and 1b are supplied in a manner of unreeling from a lead roll 11, which has the belt-shaped lead electrodes 1a and 1b in a rolled way. On the other hand, the stripping sheets 4a and 4b are supplied from stripping sheet rolls 12a and 12b. In addition, the stripping sheets 4a and 4b are accommodated in a rolled shape by winding magazines 14a and 14b after a forced cooling step, which will be described later.

In a heat-fusion step employing the heaters 6a and 6b, the sealing members 2a and 2b, which does not fuse yet, are provisionally positioned on the lead electrodes 1a and 1b with a predetermined interval, are sandwiched between the heaters 6a and 6b with the stripping sheets 4a and 4b in between. With the heaters 6a and 6b, from the outside of the stripping sheets 4a and 4b, the sealing members (2a and 2b) and the lead electrodes 1a and 1b are applied to heat under pressure. At this moment, the sealing members 2a and 2b fuses at temperature over 160°, which is fusion temperature of the sealing members 2a and 2b.

After the lapsed time enough for the sealing members 2a and 2b to fuse and completely adhere to the lead electrodes 1a and 1b without gaps, the heaters 6a and 6b are removed from the sealing members (2a and 2b) and the lead electrodes 1a and 1b. At this moment, the sealing members 2a and 2b are not stripped from the stripping sheets 4a and 4b, and keeps a laminated state.

After this, in the forced air-cooling step employing cooling machines 13a and 13b, the parts, in which the sealing members 2a and 2b fuses and adheres to the lead electrodes 1a and 1b, are conveyed to the cooling machines 13a and 13b for conducting forced air-cooling. While the stripping sheets 4a and 4b are stripped from the sealing members 2a and 2b and accommodated by the winding magazines 14a and 14b in a rolled shape after the sealing members 2a and 2b re-solidifies, the lead electrodes 1a and 1b, to which the sealing members 2a and 2b completely adhere, are rolled and accommodated by a winding magazine 15.

With the above-mentioned procedures, the sealing members 2a and 2b can completely adhere to the lead electrodes 1a and 1b without gaps.

Although in the above-mentioned embodiment, the case that Teflon sheet is employed as the stripping sheets was described, materials, which has the following quality can be preferably employed. Materials does not fuse or ablage even if heat holds temperature over the fusion temperature of the sealing members; additionally materials has physical strength, which does not occur failures even if pressure is applied with the heaters; and materials does not fuse and adhere or remain residuum to the sealing members. As the stripping sheets, sheet-like sheets can be employed besides the above-mentioned rolled type sheets.

The sealing members are not limited by cast polypropylene as mentioned above. As for materials of the sealing members, materials having acceptable adhesion to the package members and the lead electrodes, and excellent in durability, are desirable.

Although in the above-mentioned embodiment, the case that the present invention was applied to the lithium ion secondary battery, the present invention is not limited by the embodiment, it can be applied to a thin lithium ion secondary battery having the above-mentioned structure or a manufacturing process such that the corresponding parts of the lead electrodes are sealed by the sealing members.

As mentioned above, according to the lithium ion battery and the method of manufacturing the same of the present invention, the sealing members can spread between the lead electrodes and the package members without gaps. Further, according to the method of manufacturing the lithium ion battery of the present invention, the sealing members can adhere to the lead electrodes without gaps. As result of this, sealing failures caused by gaps generated between sides of the lead electrodes and the package members and gaps generated in the sides of the lead electrodes, can be prevented, which leads to high productivity and excellent hermeticity inside the battery covered with the package members, thereby, durability of the battery increases.

More further, according to the method of manufacturing the lithium ion of the secondary battery, when heat is applied to the package members or the sealing members under pressure with the heaters, between the heaters and the package members, or and the sealing members, the stripping sheets made of materials such that the fused sealing members does not adhere, are inserted, thereby enabling the fused sealing members to adhere to the surfaces the heaters even if the fused sealing members are leaked, or forced out from the ends of the package members, which achieves enhancement in productivity.

Still further, according to the method of manufacturing the lithium ion battery of the present invention, the sealing members can cool without disfiguring their shape even if the heaters are removed when the sealing members is not made in a solid state yet, thereby the heating process and the cooling process with the heaters can be simplified, further, the failure ratio caused in the covering process employing the sealing members, can decrease, which brings productivity increment drastically.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a nonaqueous-electrolyte secondary battery, the method comprising the steps of:

covering a laminating structure with a package member, the laminating structure comprising a positive electrode and a negative electrode, the package member having a sealing member inserted between a lead electrode whose one end connects to the laminating structure and the other end of the lead electrode protrudes from an end of the package member toward an outside of the package member; and fusing the sealing member by:

applying pressure with a heater to at least the end of the package member from the outside, and wherein a stripping sheet, which has a sheet-like shape made of a material such that its surface does not fuse and adhere to the sealing member, is inserted between the heater and the package member or the sealing member, the application of the pressure forming the package member into a flat shape;

separating the stripping sheet from the package member or the sealing member, whereby after the sealing member can spread between the lead electrode and the package member without a gap by fusing the sealing member, the stripping sheet is separated from the heater; and re-solidifying the sealing member to a solid state.

2. A nonaqueous-electrolyte secondary battery according to claim 1, wherein the sheet-like package member is covered with the package member employing a metal laminate pack material comprising package resin, a metal film, and a sealant layer, and sealed in its end.

3. A method of manufacturing a nonaqueous-electrolyte secondary battery according to claim 2, wherein the positive electrode is employed a transition metal chalcogen compound as an active material; and the negative electrode is employed a material capable of doping and un-doping lithium as an active material.

4. A nonaqueous-electrolyte secondary battery according to claim 3, wherein the positive electrode is employed lithium complex oxide whose main base is $LiMO_2$ (transition metal M is a material selected from the group of Co, Ni, Mn), and the negative electrode is employed a non-graphitizing carbon material, or a graphite material.

5. A method of manufacturing a nonaqueous-electrolyte secondary battery according to claim 1, wherein solid electrolyte, or gel-type electrolyte is included.

6. A method of manufacturing a nonaqueous-electrolyte secondary battery according to claim 5, wherein the electrolyte is gel-type electrolyte.

7. A method of manufacturing a nonaqueous-electrolyte secondary battery according to claim 6, wherein the gel-type electrolyte made of a fluorine macromolecular material included an electrolyte salt and a solvent.

* * * * *